United States Patent
Choi

(10) Patent No.: US 12,455,013 B2
(45) Date of Patent: Oct. 28, 2025

(54) FLUID CONTROL DEVICE AND SUBSTRATE PROCESSING APPARATUS INCLUDING THE SAME

(71) Applicant: Samsung Electronics Co., Ltd., Suwon-si (KR)

(72) Inventor: Byungchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 18/469,222

(22) Filed: Sep. 18, 2023

(65) Prior Publication Data
US 2024/0167573 A1 May 23, 2024

(30) Foreign Application Priority Data
Nov. 18, 2022 (KR) .................. 10-2022-0155802

(51) Int. Cl.
*F16K 7/12* (2006.01)
*F16K 31/122* (2006.01)

(52) U.S. Cl.
CPC .......... *F16K 7/126* (2013.01); *F16K 31/1221* (2013.01)

(58) Field of Classification Search
CPC .............................. F16K 7/126; F16K 31/1221
See application file for complete search history.

(56) References Cited

U.S. PATENT DOCUMENTS

| | | | | |
|---|---|---|---|---|
| 2,367,605 A | * | 1/1945 | Oliver | F16T 1/14 251/61.3 |
| 2,427,441 A | * | 9/1947 | Butts | F16K 7/16 251/24 |
| 2,748,797 A | * | 6/1956 | Heizer | F41A 7/04 137/513.5 |
| 4,452,422 A | * | 6/1984 | Trassl | F16K 31/1221 251/25 |
| 5,002,086 A | * | 3/1991 | Linder | F16K 41/103 251/367 |
| 5,469,774 A | * | 11/1995 | Kaspers | F16K 31/165 92/110 |
| 6,619,321 B2 | | 9/2003 | Reid et al. | |

(Continued)

FOREIGN PATENT DOCUMENTS

| JP | 4364036 B2 | 8/2009 |
|---|---|---|
| KR | 101068705 B1 | 9/2011 |
| KR | 101622754 B1 | 5/2016 |

*Primary Examiner* — Daphne M Barry
(74) *Attorney, Agent, or Firm* — Wolf, Greenfield & Sacks, P.C.

(57) ABSTRACT

A fluid control device includes: a fluid block having a first channel extending from an inlet to an outlet and a second channel above and in communication with the first channel, the fluid block including a bending cover configured to cover the second channel to thereby block fluid from flowing from the inlet to the outlet of the first channel; and a valve having a hollow portion, a first hole connected to the hollow portion, a piston in the hollow portion, and an elastic body configured to elastically support the piston, the valve configured to pressurize the bending cover, wherein the fluid block includes a guide plate below the bending cover, wherein the fluid block includes a first passage through which control gas flows, and wherein the valve includes a second passage connecting the first passage to the hollow portion.

20 Claims, 13 Drawing Sheets

(56) References Cited

U.S. PATENT DOCUMENTS

| | | |
|---|---|---|
| 7,658,482 B2 | 2/2010 | Dyer et al. |
| 7,771,029 B2 | 8/2010 | Morgan et al. |
| 8,152,133 B2 * | 4/2012 | Meinig .............. G05D 16/0641 |
| | | 137/859 |
| 8,607,873 B2 * | 12/2013 | Aadnoy .................. E21B 34/08 |
| | | 251/61.4 |
| 9,568,117 B2 * | 2/2017 | Adams ................ F16K 31/1221 |
| 9,599,250 B2 * | 3/2017 | Gossett ............... F16K 31/1262 |
| 9,982,795 B2 | 5/2018 | Twelftree |
| 10,738,898 B2 | 8/2020 | Ishibashi et al. |
| 11,162,606 B2 | 11/2021 | Suzuki et al. |
| 2007/0206050 A1 | 9/2007 | Morgan et al. |
| 2008/0099081 A1 * | 5/2008 | Yamamoto ................ F16K 1/44 |
| | | 137/497 |
| 2016/0123491 A1 | 5/2016 | Chiba et al. |

* cited by examiner

FLUID CONTROL DEVICE AND SUBSTRATE PROCESSING APPARATUS INCLUDING THE SAME

CROSS-REFERENCE TO RELATED APPLICATION

This application is based on and claims priority under 35 U.S.C. § 119 to Korean Patent Application No. 10-2022-0155802, filed on Nov. 18, 2022, in the Korean Intellectual Property Office, the disclosure of which is incorporated by reference herein in its entirety.

BACKGROUND

The inventive concept relates to a fluid control device and a substrate processing apparatus including the same.

In order to manufacture semiconductor devices, various processes, such as oxidation processes, photolithography, etching, thin film deposition, metalization, electrical die sorting (EDS), and packaging, are performed on wafers. As the miniaturization of semiconductor devices increases, the need for high-precision control of semiconductor process conditions increases. Particularly, in thin film deposition processes, a uniform thickness of deposition layers through high-precision control of process fluid is a key element of semiconductor devices.

SUMMARY

The inventive concept provides a fluid control device of which damage or deformation is prevented during preventive maintenance and breakdown maintenance and a substrate processing apparatus including the same.

The inventive concept provides a fluid control device in which pressure of control gas is constant and a substrate processing apparatus including the same.

In addition, aspects of the inventive concept is not limited to those mentioned above, and additional aspects of the inventive concept may be clearly understood by those skilled in the art from the following description.

According to an aspect of the inventive concept, there is provided a fluid control device including a fluid block having a first channel extending from an inlet at a first side of the fluid block to an outlet at a second side of the fluid block and a second channel above and in communication with the first channel, the fluid block including a bending cover configured to cover the second channel to thereby block fluid from flowing from the inlet to the outlet of the first channel, and a valve having a hollow portion and a first hole connected to the hollow portion, and including a piston in the hollow portion and an elastic body configured to elastically support the piston, the valve configured to pressurize the bending cover, wherein the fluid block includes a guide plate below the bending cover, wherein the fluid block includes a first passage through which control gas flows, and wherein the valve includes a second passage connecting the first passage to the hollow portion.

According to another aspect of the inventive concept, there is provided a substrate processing apparatus including a fluid supplier configured to supply process fluid, a first fluid control device configured to control the supply of the process fluid, and a chamber, into which the process fluid flows, configured to process a substrate, wherein the first fluid control device includes a fluid block having a first channel extending from a first side of the fluid block to an opposite second side of the fluid block, and a valve including a hollow portion, a first hole connected to the hollow portion, a piston in the hollow portion, and an elastic member configured to elastically support the piston, wherein the process fluid flows into the chamber through the first channel, wherein the fluid block includes a first passage through which control gas flows, and wherein the valve includes a second passage connecting the first passage and the hollow portion.

According to an aspect of the inventive concept, there is provided a substrate processing apparatus including: a fluid supply configured to supply process fluid, a first fluid control device configured to control a flow rate of the process fluid, and a chamber, into which the process fluid flows, configured to process a substrate, wherein the first fluid control device includes: a fluid block having a first channel extending from a first side to a second side of the fluid block and a second channel extending from an upper surface of the fluid block to the first channel, the fluid block including a bendable cover configured to cover the second channel, and a valve having a hollow portion and a first hole connected to the hollow portion, the valve including a piston in the hollow portion and an elastic body configured to elastically support the piston, the valve configured to pressurize the bendable cover, wherein the process fluid flows into the chamber through the first channel and includes at least one of $AsH_3$, $PH_3$, $H_2Se$, $SiH_4$, and $H_2S$, wherein the fluid block includes a guide plate below the bending cover, wherein the piston includes a central portion and a first protruding portion extending outwardly from an outer surface of the central portion, wherein at least a part of the central portion extends through the first hole and contacts the bendable cover, wherein the first protruding portion is in contact with a sidewall that at least partially defines the hollow portion, wherein the fluid block includes a first passage through which control gas flows, wherein the valve includes a second passage connecting the first passage to the hollow portion, and wherein a size of a cross section of the first passage is the same as a size of a cross section of the second passage.

BRIEF DESCRIPTION OF THE DRAWINGS

Embodiments will be more clearly understood from the following detailed description taken in conjunction with the accompanying drawings in which.

DETAILED DESCRIPTION

Figure 1:
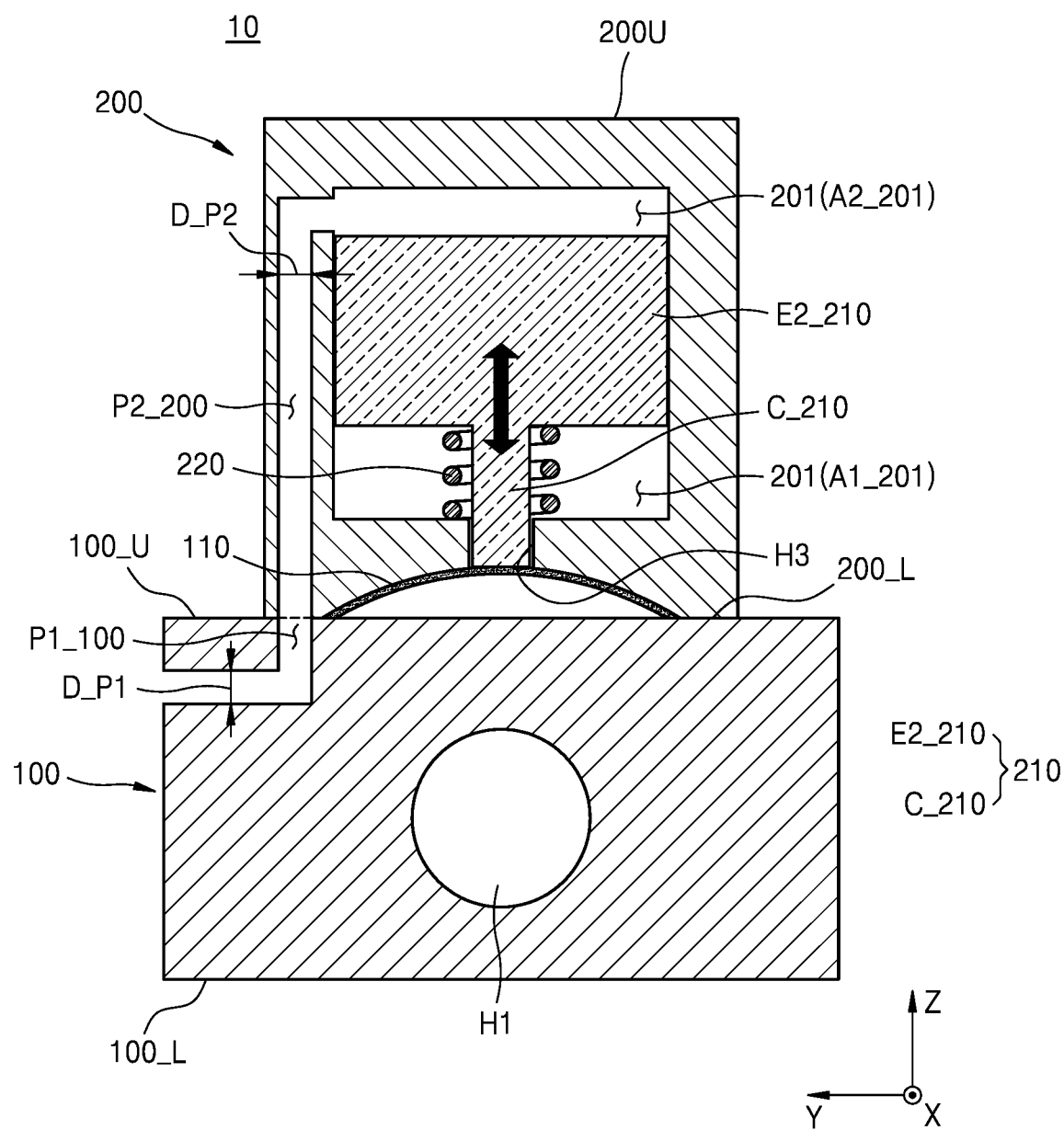
FIG. 1 is a side cross-sectional view schematically illustrating a fluid control device according to an embodiment.
Figure 2:
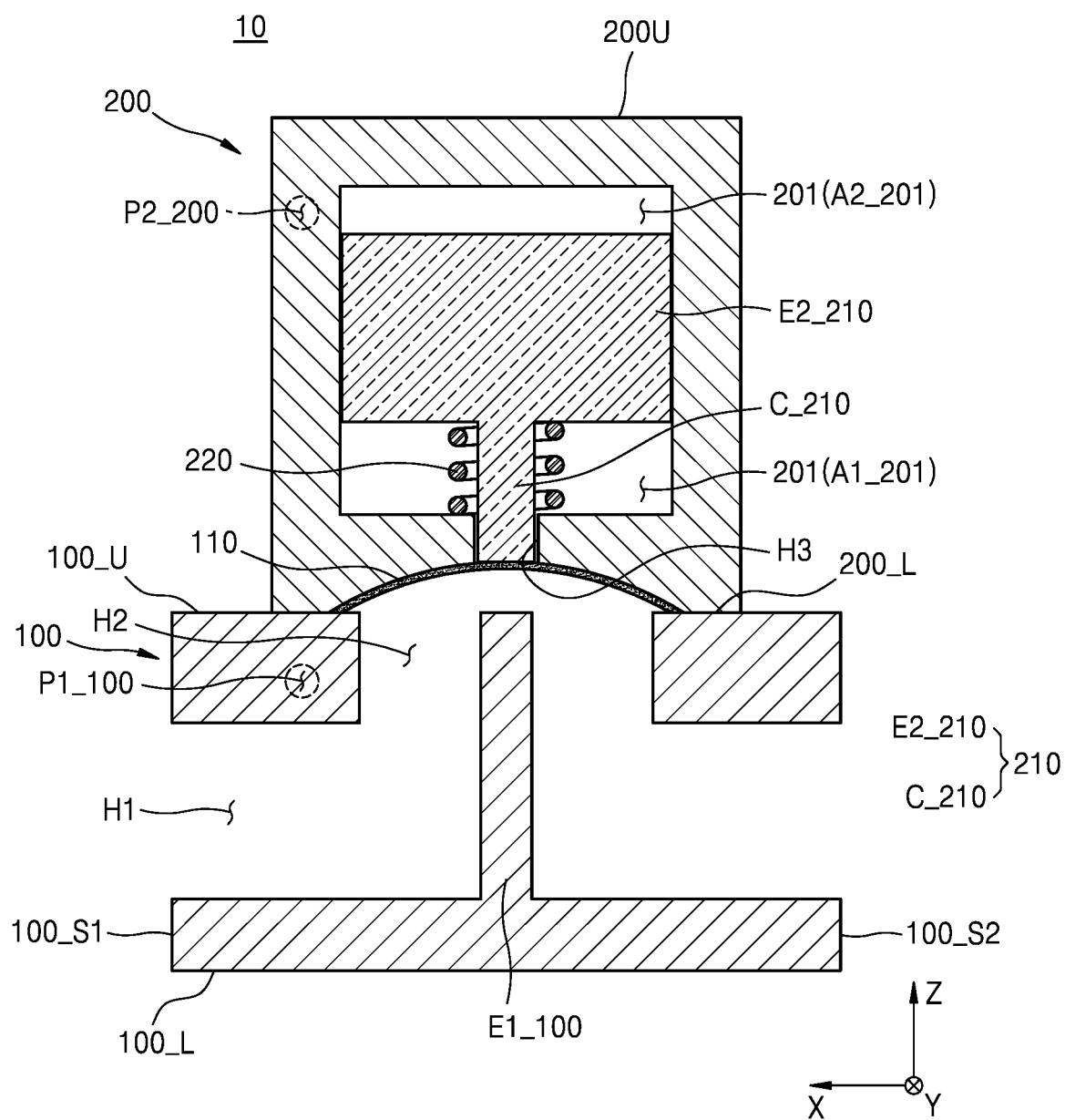
FIG. 2 is a side cross-sectional view schematically illustrating the fluid control device of FIG. 1.

FIG. 1 is a side cross-sectional view schematically illustrating a fluid control device according to an embodiment. FIG. 2 is a side cross-sectional view schematically illustrating the fluid control device of FIG. 1. FIGS. 1 and 2 are side cross-sectional views viewed from different directions.

Referring to FIGS. 1 and 2, a fluid control device 10 may include a fluid block 100 and a valve 200.

The fluid block 100 of the fluid control device 10 may provide a passage through which process fluid may flow. The fluid block 100 may have a first channel H1 extending through the fluid block 100 from one side or a first side 100_S1 to the other side or a second side 100_S2 (e.g., opposite the first side 100_S1). The fluid block 100 may have a second channel H2 therein extending from the first channel H1 to an upper surface 100_U of the fluid block 100. The fluid block 100 may include a bending cover or bendable cover 110 covering the second channel H2. The fluid block 100 may include a guide plate E1_100 protruding from or extending from the sidewall forming the first channel H1 toward the upper surface 100_U. The guide plate E1_100 may be positioned under the bending cover 110.

In some embodiments, the bending cover 110 may comprise elastic material. In some embodiments, the bending cover 110 is resilient. That is, the bending cover 110 may be deformed when an external force is applied thereto, and the bending cover 110 may return to its original shape due to its resilience when the external force is removed. In some embodiments, the bending cover 110 may be bent upward when the external force is removed, and the bending cover 110 may be bent downward when the external force is applied thereto. That is, a lower surface of the bending cover 110 may be spaced apart from an upper surface or upper portion of the second channel H2. In other words, there may be an empty space, extending from the second channel H2, under the bending cover 110. In some embodiments, the bending cover 110 may be a diaphragm.

In some embodiments, the first channel H1 may have a circular cross-section in a direction perpendicular to the direction in which the first channel H1 extends. That is, the first channel H1 may have a circular cross-section in the YZ plane. In other words, the first channel H1 may have a cylindrical shape.

In some embodiments, the second channel H2 may have a circular cross-section in a direction perpendicular to the direction in which the second channel H2 extends. That is, the second channel H2 may have a circular cross-section in the XY plane. In other words, the second channel H2 may have a cylindrical shape.

In some embodiments, an end of the first channel H1 exposed to or at one side 100_S1 of the fluid block 100 is an inlet through which the process fluid flows in, and an end of the first channel H1 exposed to or at the other side 100_S2 of the fluid block 100 is an outlet through which the process fluid flows out, wherein the process fluid may flow in from one side 100_S1 of the fluid block 100 and flow out to the other side 100_S2 of the fluid block 100. That is, the process fluid may flow inside the fluid block 100 through the first channel H1 of the fluid block 100 as a passage.

In some embodiments, the guide plate E1_100 may extend to the upper surface 100_U of the fluid block 100, so that the upper surface of the guide plate E1_100 and the upper surface 100_U of the fluid block 100 may be on the same plane or coplanar. In other words, the guide plate E1_100 may be positioned in the second channel H2. That is, the guide plate E1_100 may extend to the upper surface or upper portion of the second channel H2 across the first channel H1.

In some embodiments, the process fluid may move from one side 100_S1 to the other side 100_S2 of the fluid block 100 through the first channel H1 and the second channel H2. The guide plate E1_100 protruding from the sidewall forming the first channel H1 may hinder the flow of the process fluid.

That is, when the process fluid passes through the first channel H1, the guide plate E1_100 positioned in the first channel H1 may guide the movement of the process fluid to the second channel H2. The process fluid guided by the guide plate E1_100 in the first channel H1 may move to the second channel H2 connected to the first channel H1. The bending cover 110 covering the second channel H2 may cause the process fluid that has moved to the second channel H2 to flow over the guide plate E1_100. The process fluid that has passed the guide plate E1_100 may flow back into the first channel H1 and flow out to the other side 100_S2 of the fluid block 100.

That is, the process fluid passing through the fluid block 100 may be guided along a preset flow path by the guide plate E1_100 located inside the first channel H1 and the second channel H2. The flow-guided process fluid may pass under the bending cover 110 covering the second channel H2 and flow out to the other side 100_S2 of the fluid block 100. In other words, the process fluid may be routed by the guide plate E1_100 to pass through the first channel H1 and the second channel H2, and the process fluid may flow in from one side 100_S1 of the fluid block 100 and flow out to the other side 100_S2 of the fluid block 100.

Figure 3:
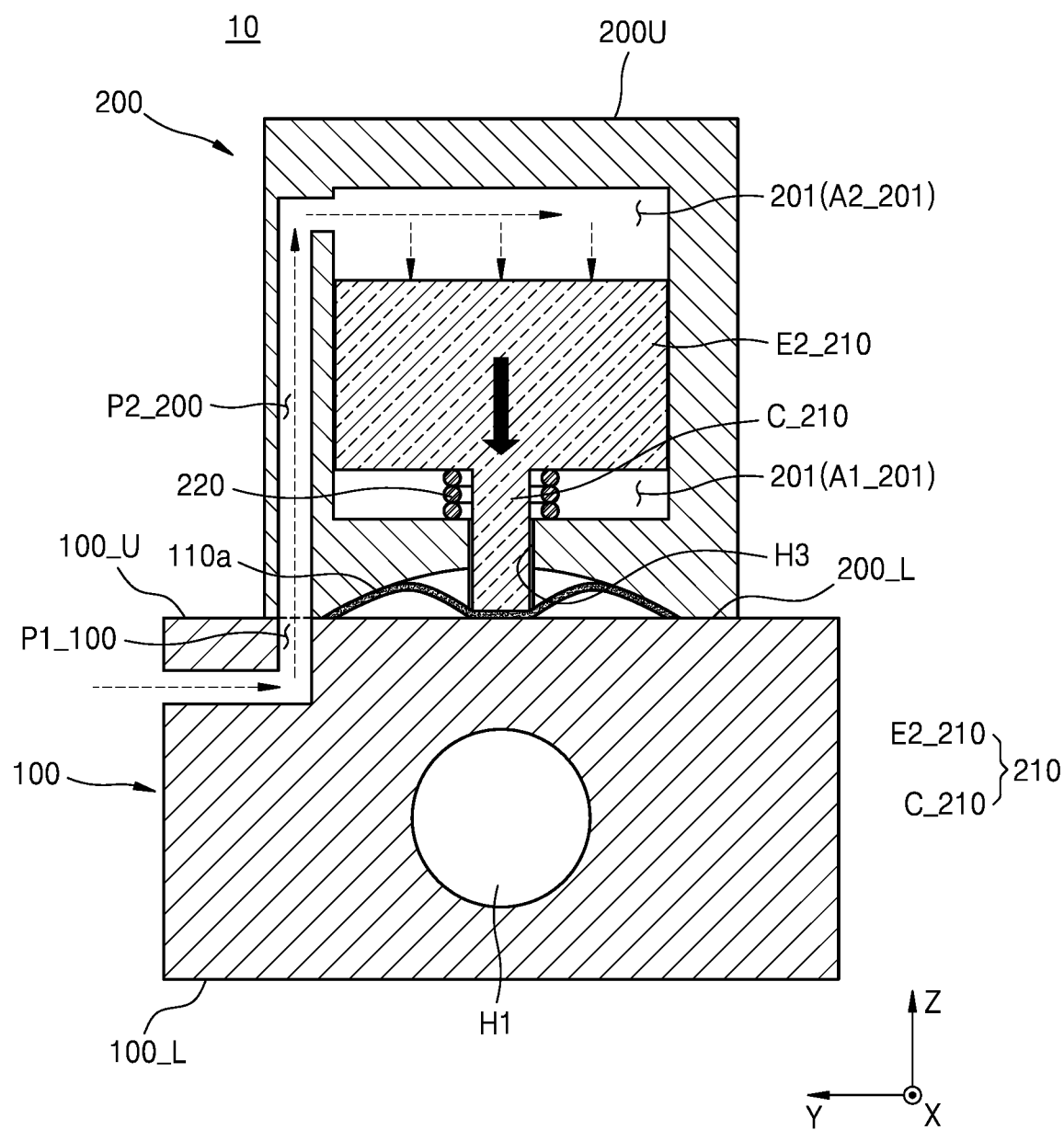
FIG. 3 is a side cross-sectional view schematically illustrating a state in which control gas flows into the fluid control device of FIG. 1.

In some embodiments, the bending cover 110 may contact the guide plate E1_100 when the bending cover 110a in FIG. 3 subjected to an external force is bent downward. That is, when an external force is applied to the bending cover 110, an empty space, extending from the second channel H2, under the bending cover 110 may be removed.

When the bending cover 110 is in contact with the guide plate E1_100, the process fluid which flows in from one side 100_S1 of the fluid block 100 may not flow out to the other side 100_S2 of the fluid block 100 because the path of the process fluid is blocked by the bending cover 110 and the guide plate E1_100. That is, the movement path of the process fluid may be blocked by applying an external force to the bending cover 110.

Specifically, the process fluid may flow in from one side 100_S1 of the fluid block 100, and the flow of the process fluid may be guided by the guide plate E_100 while moving through the first channel H1. The process fluid, the flow of which is guided by the guide plate E1_100, may move to the second channel H2. The flow of the process fluid that has moved to the second channel H2 is restricted by the bending cover 110 and the guide plate E1_100. The process fluid, the flow of which is restricted by the bending cover 110 and the guide plate E1_100, may not flow out to the other side 100_S2 of the fluid block 100. In other words, when the bending cover 110 is in contact with the guide plate E1_100, the process fluid may not be supplied.

The fluid block 100 may include a first passage P1_100. The first passage P1_100 may provide a path along which control gas or control fluid flows in from the outside of the fluid block 100 and flows out to the upper surface 100_U of the fluid block 100. In some embodiments, the first passage P1_100 may extend from one side 100_S1 of the fluid block 100 to the upper surface 100_U of the fluid block 100. In FIG. 1, the first passage P1_100 is formed perpendicular to the first channel H1 at the end of the fluid block 100, but is not limited thereto, and may include an area extending parallel to the first channel H1.

A cross-section of the first passage P1_100 in a direction perpendicular to the direction in which the first passage P1_100 extends may have a circular shape. That is, the first passage P1_100 may have a cylindrical shape. In some embodiments, the diameter D_P1 of the first passage P1_100 may be about 1 millimeter (mm) to about 4 mm.

The valve 200 of the fluid control device 10 may pressurize the bending cover 110. The valve 200 may have a hollow portion 201 and a first hole H3. The first hole H3 connected to the hollow portion 201 may extend from a lower surface 200_L of the valve 200 to the hollow portion 201. The valve 200 may include a piston 210 and an elastic body or elastic member 220. The piston 210 and the elastic body 220 may be located in the hollow portion 201.

The piston 210 may have a central portion C_210 and a first protruding portion E2_210. The first protruding portion E2_210 may protrude or extend outward from the outer surface of the central portion C_210.

At least a part of the central portion C_210 of the piston 210 may pass through the first hole H3 to come into contact with the bending cover 110 and apply an external force to the bending cover 110. That is, at least a part of the central portion C_210 may protrude from or extend from the lower surface 200_L of the valve 200 and come into contact with the bending cover 110.

The first protruding portion E2_210 of the piston 210 may come into contact with a sidewall forming or at least partially defining the hollow portion 201. That is, an end or side of the first protruding portion E2_210 may come into contact with a sidewall forming the hollow portion 201. In other words, the hollow portion 201 may be divided into a first area A1_201 and a second area A2_201 by the first protruding portion E2_210, wherein the first area A1_201 may be separated from the second area A2_201 by the first protruding portion E2_210 so that fluid does not move therebetween. That is, the first protruding portion E2_210 may separate the first area A1_201 and the second area A2_201 to block the communication between the first area A1_201 and the second area A2_201.

The elastic body 220 of the valve 200 may have a spring shape. The elastic body 220 of the valve 200 may elastically support the piston 210. The elastic body 220 of the valve 200 may be resilient. That is, the elastic body 220 may return to its original length when extended or contracted. In some embodiments, the elastic body 220 may be positioned between the first protruding portion E2_210 of the piston 210 and the lower surface forming the hollow portion 201. That is, when the piston 210 moves downward after an external force is applied thereto, the length of the elastic body 220 may be reduced. When the external force applied to the piston 210 is removed, the elastic body 220 may return to its original length, thereby moving the piston 210 upward.

FIG. 1 only shows the elastic body is positioned under the first protruding portion E2_210, but is not limited thereto, and may be positioned above the first protruding portion E2_210.

The valve 200 may include a second passage P2_200 in communication with each of the first passage P1_100 and the hollow portion 201. The second passage P2_200 may connect the first passage P1_100 to the hollow portion 201. That is, the second passage P2_200 may provide a path along which the control gas having flowed out from the first passage P1_100 flows into the hollow portion 201. In other words, the control gas may flow into the hollow portion 201 through the first passage P1_100 and the second passage P2_200. In some embodiments, the control gas may flow in from the lower surface 200_L of the valve 200 and may flow out to the hollow portion 201 through the second passage P2_200.

A cross-section of the second passage P2_200 in a direction perpendicular to the direction in which the second passage P2_200 extends may have a circular shape. That is, the second passage P2_200 may have a cylindrical shape. In some embodiments, the diameter D_P2 of the second passage P2_200 may be about 1 mm to about 4 mm.

In some embodiments, an area of a cross-section of the first passage P1_100 in a direction perpendicular to the direction in which the first passage P1_100 extends may be a first area. An area of a cross-section of the second passage P2_200 in a direction perpendicular to the direction in which the second passage P2_200 extends may be a second area. The first area may be the same as the second area. In other words, the diameter D_P1 of the first passage P1_100 may be the same as the diameter D_P2 of the second passage P2_200. FIG. 1 shows that the diameter D_P1 of the first passage P1_100 is the same as the diameter D_P2 of the second passage P2_200, but is not limited thereto, and the diameter D_P2 of the second passage P2_200 may be greater than the diameter D_P1 of the first passage P1_100.

In some embodiments, the hollow portion 201 may be divided into the first area A1_201 and the second area A2_201 by the first protruding portion E2_210 as a boundary therebetween. The first area A1_201 may be an area where the elastic body 220 is located, and the second area A2_201 may be an area in communication with the second passage P2_200. That is, the hollow portion 201 is divided into multiple areas, and the area where the elastic body 220 is located may be different from the area in communication with the second passage P2_200.

In some embodiments, the first area A1_201 may be connected to the first hole H3 of the valve 200, and the second area A2_201 may be connected to the second passage P2_200. In other words, the first area A1_201 may be located below the second area A2_201. That is, the first area A1_201 where the elastic body 220 is located may be located below the second area A2_201.

When the control gas flows into the second area A2_201, the pressure in the second area A2_201 may increase to apply an external force to the piston 210 in a direction from the second area A2_201 toward the first area A1_201. The piston 210 subjected to an external force may be positioned adjacent to the lower surface forming the hollow portion 201. That is, the piston 210 may move downward, and the central portion C_210 of the piston 210 may be positioned adjacent to the guide plate E1_100. In other words, when the control gas flows into the second area A2_201, the piston 210 may move downward to increase the volume of the second area A2_201 and decrease the volume of the first area A1_201.

In the fluid control device 10 of the inventive concept, the first passage P1_100 and the second passage P2_200 through which the control gas is supplied may be located inside the fluid control device 10. Since the first passage P1_100 and the second passage P2_200 through which the control gas is supplied are located inside the fluid control device 10, damage, hardening, and deformation of the first passage P1_100 and the second passage P2_200 through which the control gas is supplied may be reduced during preventive maintenance (PM) or breakdown maintenance (BM). In addition, in the fluid control device 10, the supply of the process fluid may be constant due to the reduction of damage, hardening, and deformation of the first passage P1_100 and the second passage P2_200 through which the control gas is supplied. For a substrate processing apparatus to which process fluid is constantly supplied, a high-quality substrate process may be performed.

Figure 4:
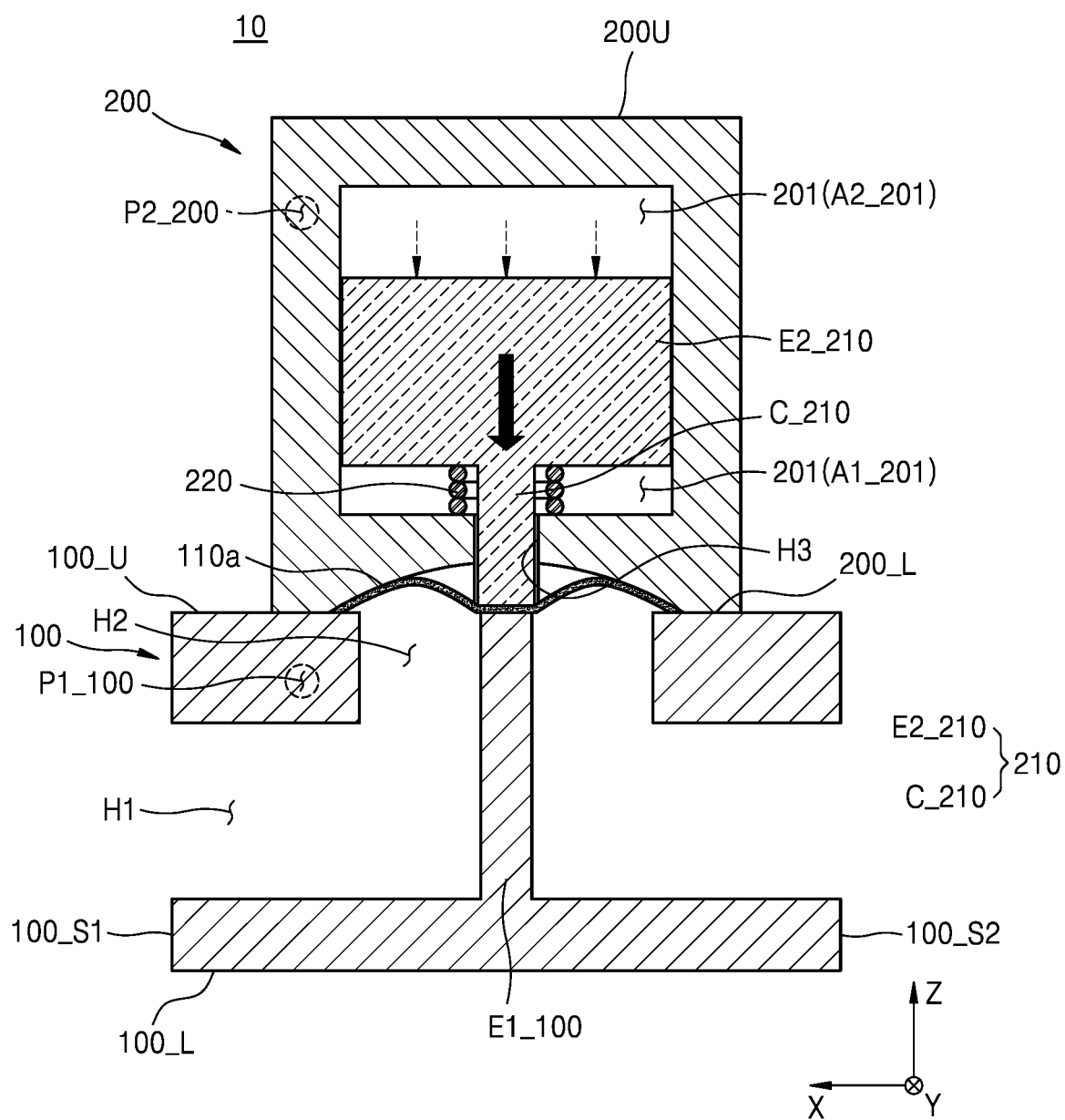
FIG. 4 is a side cross-sectional view schematically illustrating a state in which control gas flows into the fluid control device of FIG. 1.

FIG. 3 is a side cross-sectional view schematically illustrating a state in which control gas flows into the fluid control device 10 of FIG. 1. FIG. 4 is a side cross-sectional view schematically illustrating a state in which control gas flows into the fluid control device 10 of FIG. 1. FIGS. 3 and 4 are the side cross-sectional views viewed from different directions.

Referring to FIGS. 3 and 4, an operation of the fluid control device 10 when the control gas flows into the fluid control device 10 is described. In FIGS. 3 and 4, the path along which the control gas moves is indicated by dashed-arrows.

In some embodiments, before the control gas flows into the second area A2_201, the elastic body 220 may have its original length, and the bending cover 110 may be spaced apart from the guide plate E1_100. That is, before the control gas flows into the hollow portion 201, the process fluid may move from one side 100_S1 to the other side 100_S2 of the fluid block 100 through the first channel H1 and the second channel H2.

When the control gas flows into the second area A2_201, the pressure in the second area A2_201 may increase to move the piston 210 in a direction from the second area A2_201 toward the first area A1_201. When the piston 210 moves, the central portion C_210 of the piston 210 may move toward the guide plate E1_100 through the first channel H1 and the second channel H2. When the central portion C_210 moves toward the guide plate E1_100 to apply an external force to a bending cover 110a, the bending cover 110a may contact the guide plate E1_100. When the bending cover 110a subjected to an external force contacts the guide plate E1_100, the movement of the process fluid from one side 100_S1 to the other side 100_S2 of the fluid block 100 may be restricted.

In some embodiments, when the control gas flows into the second area A2_201, the bending cover 110a may contact the guide plate E1_100. That is, when the control gas flows into the second area A2_201, the piston 210 may move downward to apply an external force to the bending cover 110a. The bending cover 110a subjected to an external force by the piston 210 may be bent downward. The bending cover 110a subjected to an external force may be bent downward to contact the guide plate E1_100. That is, when the control gas flows into the second area A2_201 located adjacent to the upper surface 200_U of the valve 200, second area A2_201 may increase to move the piston 210 downward and the bending cover 110a may contact the guide plate E1_100.

In some embodiments, when the control gas flows into the second area A2_201, the second area A2_201 may increase to compress or contract the elastic body 220 positioned between the lower surface of the first protruding portion E2_210 and the lower wall forming the hollow portion 201. In other words, as the second area A2_201 increases, the first area A1_201 may decrease to contract the elastic body 220 positioned in the first area A1_201. That is, when the control gas flows into the hollow portion 201, the fluid control device 10 may be closed since the piston 210 moves toward the lower surface 200_L and the bending cover 110 contacts the guide plate E1_100.

When the inflow of the control gas into the second area A2_201 is stopped, the pressure in the second area A2_201 becomes equal to the pressure in the first area A1_201 and the elastic body 220 may relax or expand. In other words, when the pressure in the second area A2_201 decreases, the elastic body 220 may return to its original length and the second area A2_201 may decrease. That is, when the inflow of the control gas into the hollow portion 201 is stopped, the fluid control device 10 may be open since the piston 210 moves toward the upper surface 200_U of the valve 200 and the bending cover 110 is spaced apart from the guide plate E1_100.

In some embodiments, before the control gas flows into the hollow portion 201, the process fluid may be supplied while the fluid control device 10 is open. After the control gas flows into the hollow portion 201, the process fluid may be blocked while the fluid control device 10 is closed. That is, the fluid control device 10 may be open by default.

Figure 5:
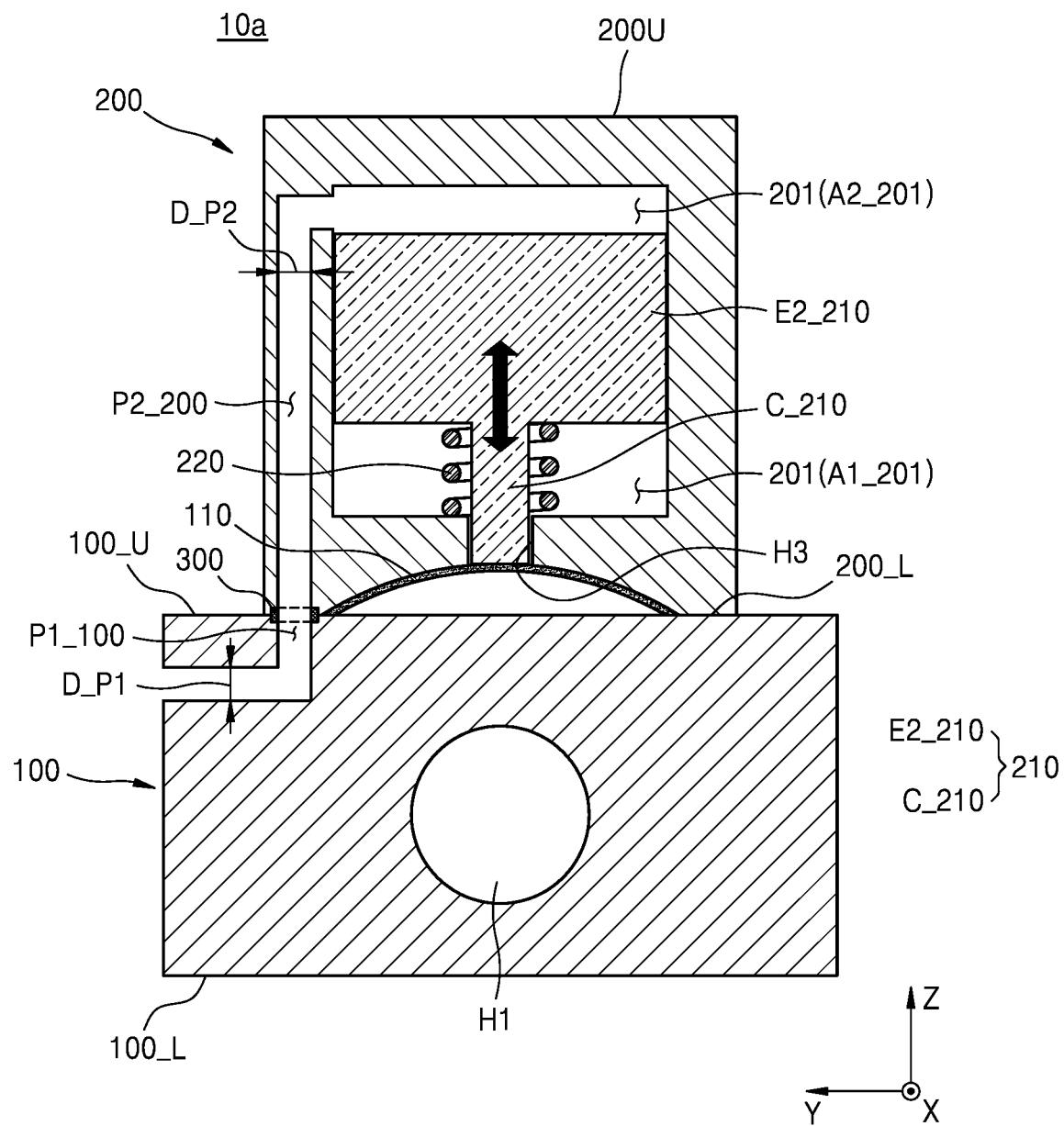
FIG. 5 is a side cross-sectional view schematically illustrating a fluid control device according to an embodiment.

FIG. 5 is a side cross-sectional view schematically illustrating a fluid control device 10 according to an embodiment.

Hereinafter, in the interest of brevity, descriptions that are substantially the same between the fluid control device 10a of FIG. 5 and the fluid control device 10 of FIG. 1 may be omitted and differences therebetween are described.

Referring to FIG. 5, the fluid control device 10a may further include a sealing portion or sealing member 300. The sealing portion 300 may be located in an area where the first passage P1_100 is connected to the second passage P2_200. The sealing portion 300 may suppress an outflow of the control gas in the area where the first passage P1_100 is connected to the second passage P2_200. That is, the sealing portion 300 may be located in an area where the fluid block 100 including the first passage P1_100 comes into contact with the valve 200 including the second passage P2_200. In some embodiments, the sealing portion 300 may include gasket sealing.

In the fluid control device 10a of the inventive concept, the sealing portion 300 may prevent the control gas from flowing between the first passage P1_100 and the second passage P2_200. That is, the sealing portion 300 may suppress the outflow of the control gas to keep the pressure in the second area A2_201 constant.

Figure 6:
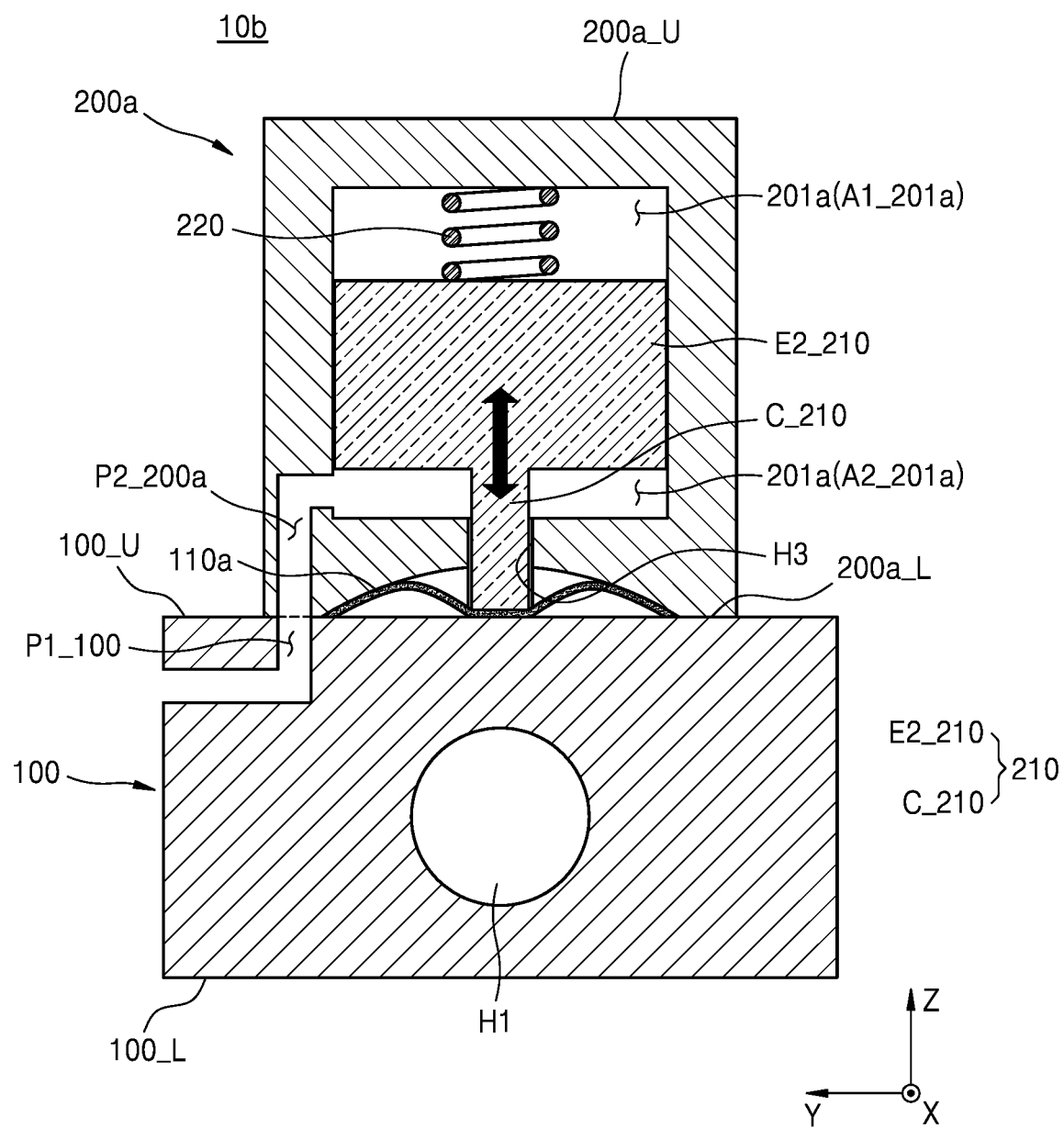
FIG. 6 is a side cross-sectional view schematically illustrating a fluid control device according to an embodiment.
Figure 7:
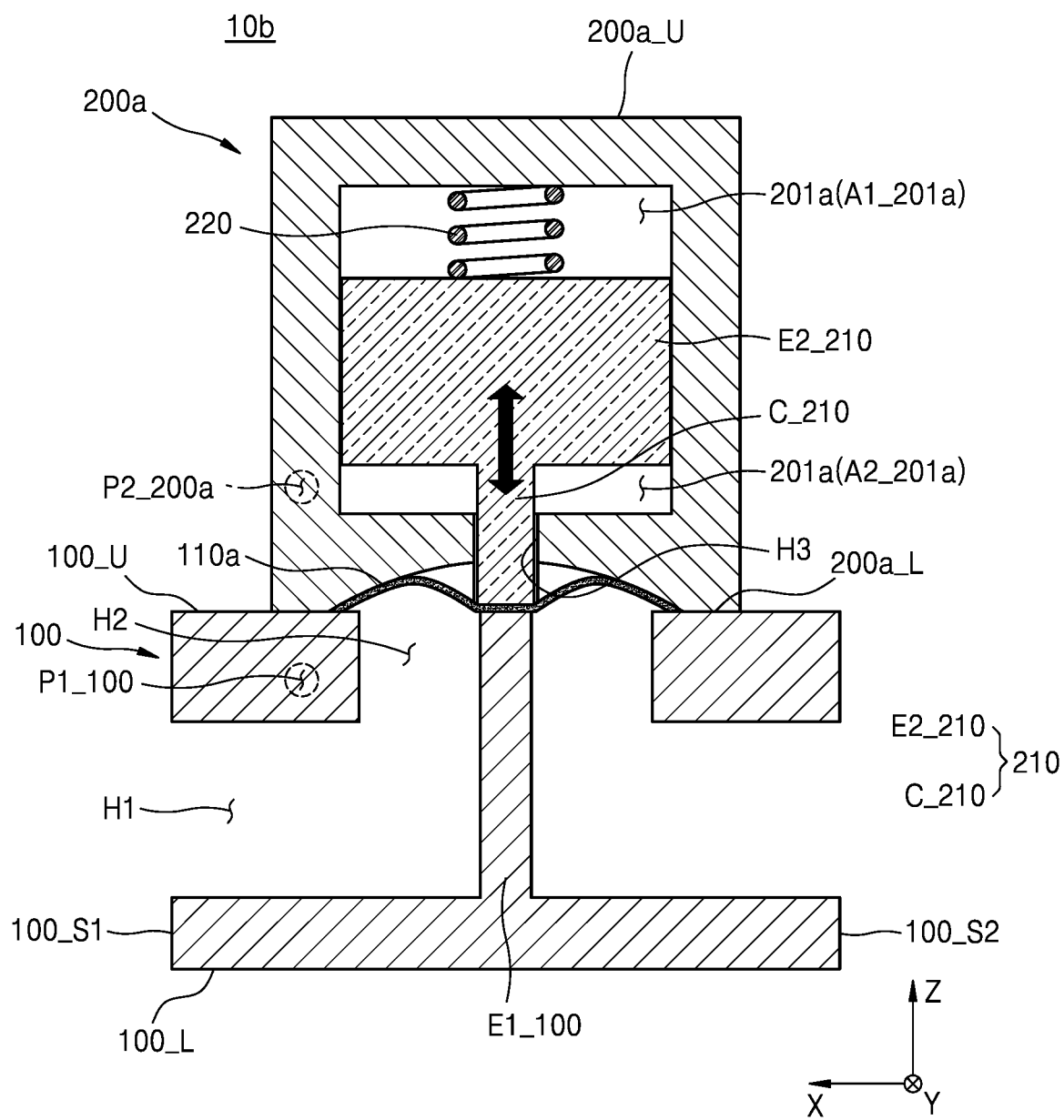
FIG. 7 is a side cross-sectional view schematically illustrating the fluid control device of FIG. 6.

FIG. 6 is a side cross-sectional view schematically illustrating a fluid control device according to an embodiment. FIG. 7 is a side cross-sectional view schematically illustrating the fluid control device of FIG. 6. FIGS. 6 and 7 are side cross-sectional views viewed from different directions.

Referring to FIGS. 6 and 7, a fluid control device 10b may include the fluid block 100 and a valve 200a. Hereinafter, in the interest of brevity, descriptions that are substantially the same between the fluid control device 10b of FIG. 6 and the fluid control device 10 of FIG. 1 may be omitted and differences therebetween are described.

The fluid block 100 of the fluid control device 10b may serve as a passage through which the process fluid flows. The fluid block 100 may have the first channel H1 extending from one side 100_S1 to the other side 100_S2 through the fluid block 100. The fluid block 100 may have the second channel H2 therein extending from the first channel H1 to the upper surface 100_U of the fluid block 100. The fluid block 100 may include the bending cover 110a covering the second channel H2. The fluid block 100 may include the guide plate E1_100 protruding from the sidewall forming the first channel H1 toward the upper surface 100_U. The guide plate E1_100 may be located below the bending cover 110a. In some embodiments, the fluid block 100 may include the fluid block 100 of FIG. 1.

The valve 200a of the fluid control device 10b may pressurize the bending cover 110a. The valve 200a may have the hollow portion 201a and the first hole H3. The first hole H3 connected to the hollow portion 201a may extend from the lower surface 200a_L of the valve 200a to the hollow portion 201a. The valve 200a may include the piston 210 and the elastic body 220.

The piston 210 and the elastic body 220 may be located in the hollow portion 201a. The piston 210 may have the central portion C_210 and the first protruding portion E2_210. The first protruding portion E2_210 may protrude outward from the outer surface of the central portion C_210.

In some embodiments, the hollow portion 201a may be divided into the first area A1_201a and the second area A2_201a by the first protruding portion E2_210 as a boundary therebetween. The first area A1_201a may be an area where the elastic body 220 is located, and the second area A2_201a may be an area where the second passage P2_200a is located. That is, the hollow portion 201a is divided into multiple areas, and the area where the elastic body 220 is located may be different from the area connected to the second passage P2_200a.

In some embodiments, the second area A2_201a may be connected to the first hole H3 and the second passage P2_200a of the valve 200a, and the first area A1_201a may be adjacent to the upper surface 200a_U of the valve 200a. In other words, the first area A1_201a may be positioned above the second area A2_201a. That is, the first area A1_201a where the elastic body 220 is located may be positioned above the second area A2_201a.

Since the elastic body 220 is positioned above the piston 210, the piston 210 may pressurize the bending cover 110a before an external force is applied to the piston 210. The bending cover 110a subjected to an external force may be bent downward. That is, the bending cover 110a subjected to an external force may be bent downward to come into contact with the guide plate E1_100. When the bending cover 110a subjected to an external force contacts the guide plate E1_100, the process fluid may not move from one side 100_S1 to the other side 100_S2 of the fluid block 100.

In other words, before the control gas flows into the second area A2_201a of the hollow portion 201a, the fluid control device 10b may be closed so that the movement of the process fluid is blocked. Before the control gas flows into the second area A2_201a, the bending cover 110a may contact the guide plate E1_100.

In some embodiments, when the control gas flows into the second area A2_201a, the bending cover 110a may be spaced apart from the guide plate E1_100. That is, when the control gas flows into the second area A2_201a, the pressure in the second area A2_201a increases so that the piston 210 may move in a direction from the second area A2_201a toward the first area A1_201a. In other words, the piston 210 may move toward the upper surface 200a_U of the valve 200a. When the piston 210 moves toward the upper surface 200a_U of the valve 200a, the external force applied to the bending cover 110a may be removed, and the bending cover 110a may be bent upward.

Figure 8:
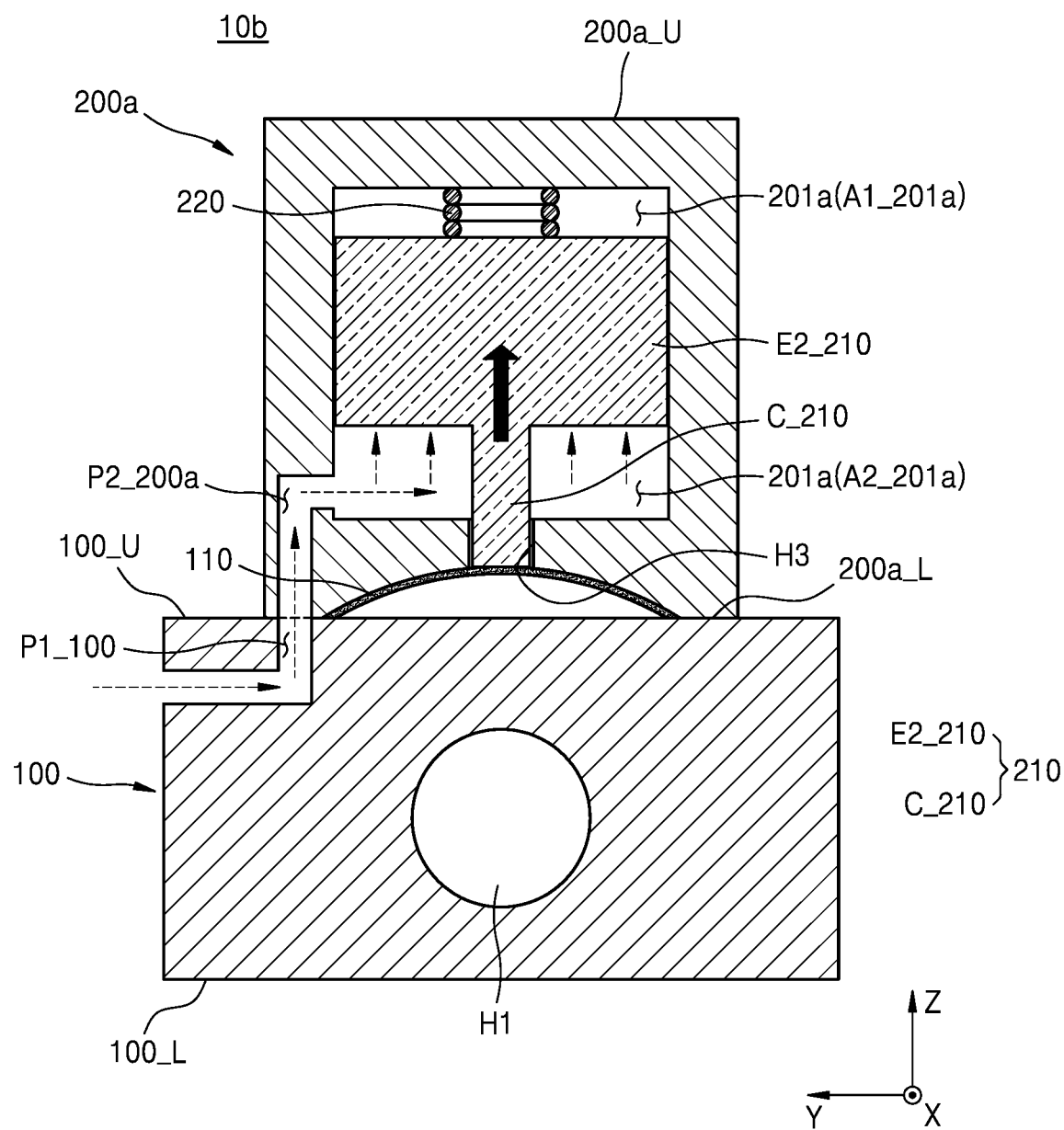
FIG. 8 is a side cross-sectional view schematically illustrating a state in which control gas flows into the fluid control device of FIG. 6.
Figure 9:
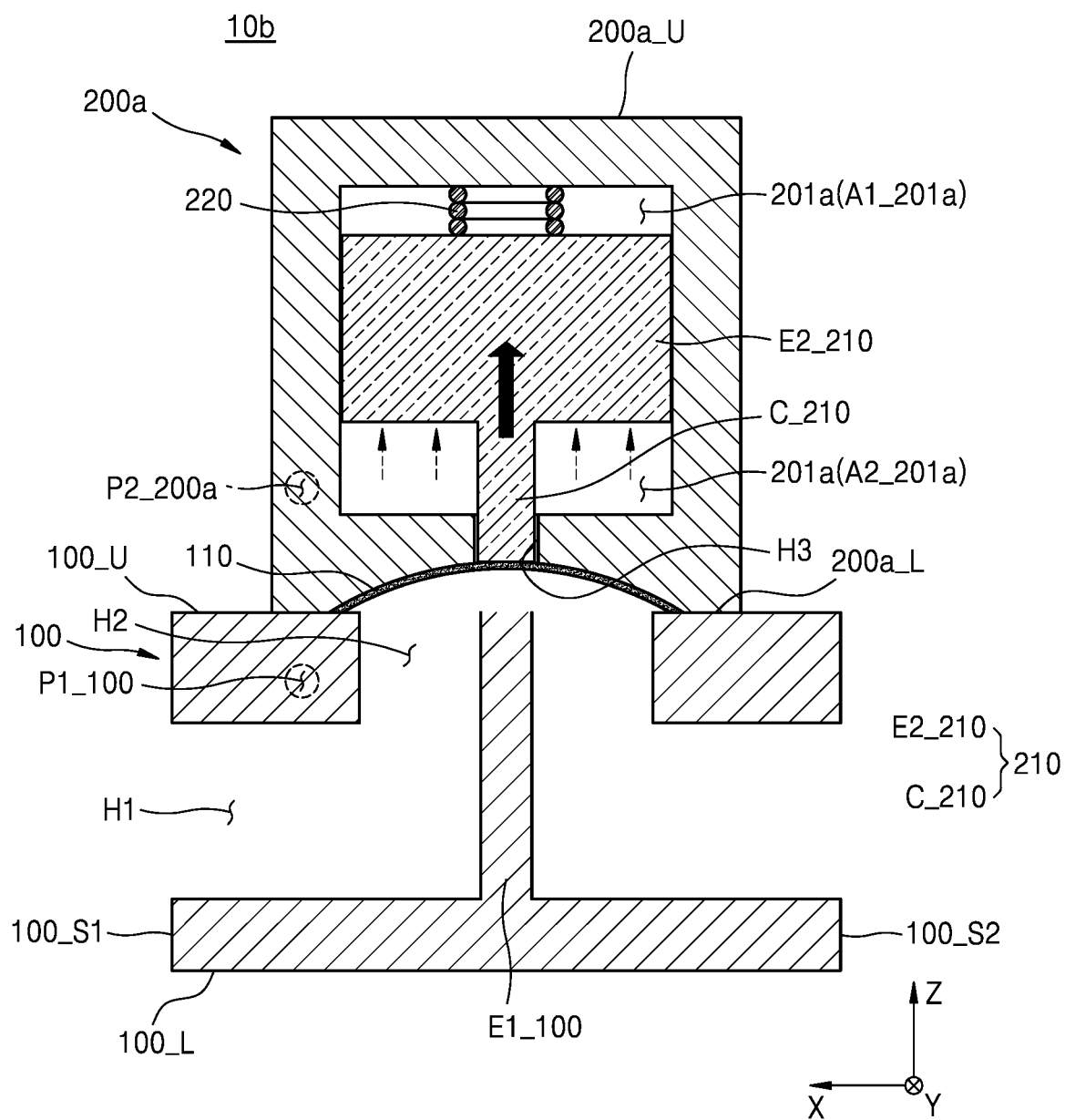
FIG. 9 is a side cross-sectional view schematically illustrating a state in which control gas flows into the fluid control device of FIG. 6.

FIG. 8 is a side cross-sectional view schematically illustrating a state in which control gas flows into the fluid control device 10b of FIG. 6. FIG. 9 is a side cross-sectional view schematically illustrating a state in which control gas flows into the fluid control device of FIG. 6. FIGS. 8 and 9 are the side cross-sectional views viewed from different directions.

Referring to FIGS. 8 and 9, an operation of the fluid control device 10b when the control gas flows into the fluid control device 10b is described. In FIGS. 8 and 9, the path along which the control gas moves is indicated by dashed-arrows.

When the control gas flows into the second area A2_201a, the pressure in the second area A2_201a may increase to move the piston 210 in a direction from the second area A2_201a toward the first area A1_201a. When the piston 210 moves, the central portion C_210 of the piston 210 may move toward the upper surface 200a_U of the valve 200a. When the central portion C_210 moves toward the upper surface 200a_U of the valve 200a, the external force applied to the bending cover 110 may be removed to separate the bending cover 110 from the guide plate E1_100. When the bending cover 110 is spaced apart from the guide plate E1_100, the process fluid may move from one side 100_S1 to the other side 100_S2 of the fluid block 100.

In some embodiments, when the control gas flows into the second area A2_201a, the bending cover 110 may be spaced apart from the guide plate E1_100. That is, when the control gas flows into the second area A2_201a, the external force applied to the bending cover 110 may be removed while the piston 210 moves upward. When the external force applied to the bending cover 110 is removed, the bending cover 110 may be bent upward. When the external force applied to the bending cover 110 is removed, the bending cover 110 may be bent upward and spaced apart from the guide plate E1_100. That is, when the control gas flows into the second area A2_201a located adjacent to the lower surface 200a_L of the valve 200a, the second area A2_201a may increase and the piston 210 may move upward to separate the bending cover 110 from the guide plate E1_100.

In some embodiments, as the control gas flows into the second area A2_201a, the second area A2_201a may increase and the elastic body 220 positioned between the upper surface of the first protruding portion E2_210 and the upper wall forming the hollow portion 201 may compress or contract. In other words, as the second area A2_201a increases, the first area A1_201a may decrease to contract the elastic body 220 positioned in the first area A1_201a. That is, when the control gas flows into the second area A2_201a, the fluid control device 10b may be open since the piston 210 moves toward the upper surface 200a_U of the valve 200a and the bending cover 110 is spaced apart from the guide plate E1_100.

When the inflow of the control gas into the second area A2_201a is stopped, the pressure in the second area A2_201a becomes equal to the pressure in the first area A1_201a and the elastic body 220 may relax or expand. In other words, when the pressure in the second area A2_201a decreases, the elastic body 220a may return to its original length and the second area A2_201a may decrease. That is, when the inflow of the control gas into the hollow portion 201a is stopped, the fluid control device 10 may be closed since the piston 210 moves toward the lower surface 200a_L of the valve 200a and the bending cover 110a contacts the guide plate E1_100.

In some embodiments, before the control gas flows into the hollow portion 201a, the process fluid may be blocked while the fluid control device 10b is closed. That is, the fluid control device 10b may be closed by default.

The first passage P1_100 and the second passage P2_200a through which the control gas is supplied to the valve 200a may be located inside the fluid control device 10b of the inventive concept. Since the first passage P1_100 and the second passage P2_200a through which the control gas is supplied are located inside the fluid control device 10b, damage, hardening, and deformation of the first passage P1_100 and the second passage P2_200a through which the control gas is supplied may be reduced during PM or BM.

Figure 10:
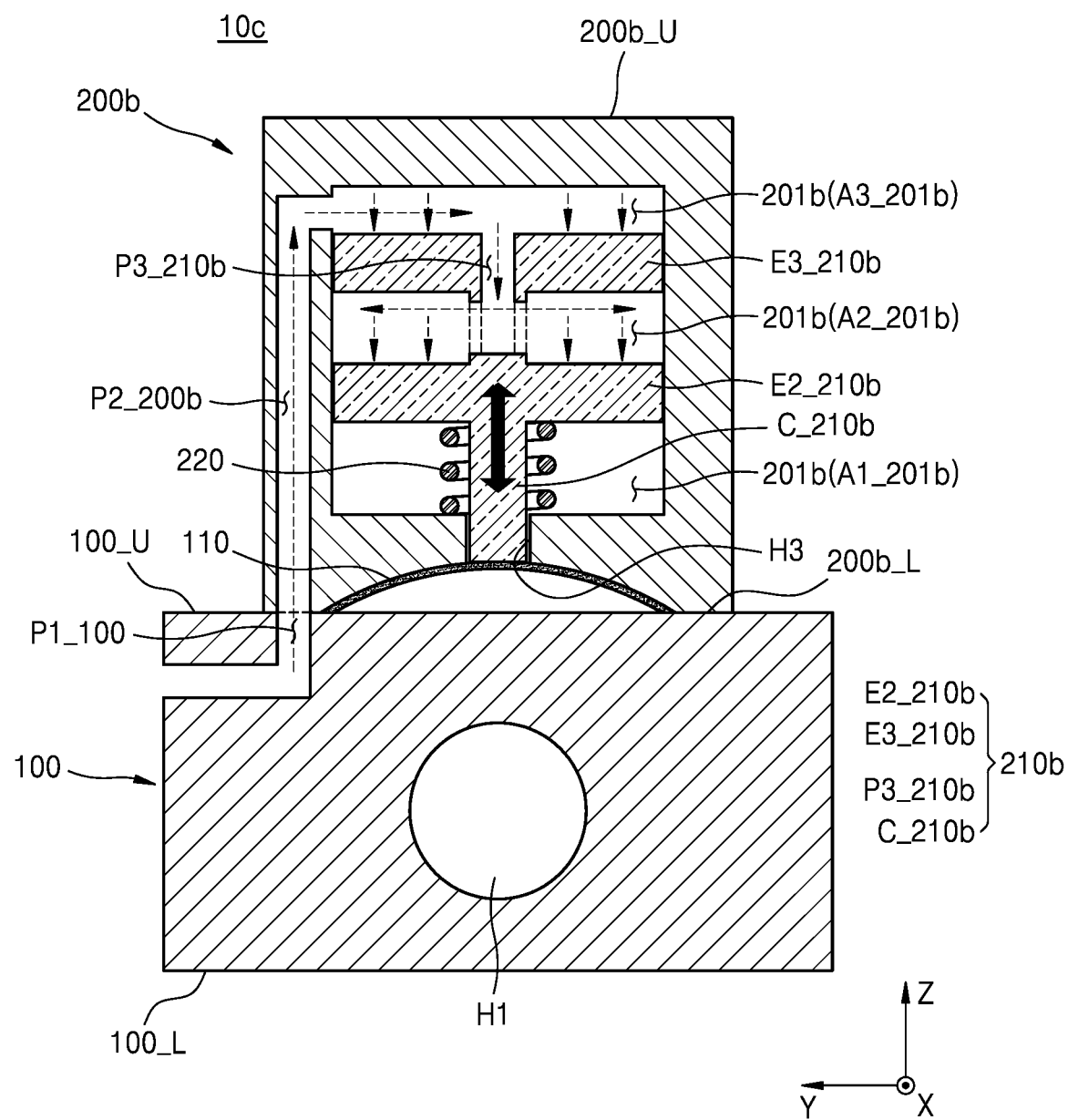
FIG. 10 is a side cross-sectional view schematically illustrating a fluid control device according to an embodiment.

FIG. 10 is a side cross-sectional view schematically illustrating a fluid control device according to an embodiment.

Referring to FIG. 10, a fluid control device 10c may include the fluid block 100 and a valve 200b. Hereinafter, in the interest of brevity, descriptions that are substantially the same between the fluid control device 10c of FIG. 10 and the fluid control device 10 of FIG. 1 may be omitted and differences therebetween are described.

In some embodiments, the fluid block 100 may be or include the fluid block 100 of FIG. 1.

The valve 200b of the fluid control device 10c may pressurize the bending cover 110. The valve 200b may have the hollow portion 201b and the first hole H3. The first hole H3 may be connected to the hollow portion 201b and may extend from the lower surface 200b_L of the valve 200b to the hollow portion 201b. The valve 200b may include the piston 210b and the elastic body 220.

The piston 210b and the elastic body 220 may be located in the hollow portion 201b. The piston 210b may include the central portion C_210b, the first protruding portion E2_210b, and a second protruding portion E3_210b. The first protruding portion E2_210b may protrude outward from the outer surface of the central portion C_210b. The second protruding portion E3_210b may protrude outward from the outer surface of the central portion C_210b.

The first protruding portion E2_210b may be spaced apart from the second protruding portion E3_210b. In some embodiments, the second protruding portion E3_210b may be closer to the upper surface 200b_U of the valve 200b than the first protruding portion E2_210b.

At least a part of the central portion C_210b of the piston 210b may pass through the first hole H3 and come into contact with the bending cover 110. That is, at least a part of the central portion C_210b may protrude from the lower surface 200b_L of the valve 200b and come into contact with the bending cover 110.

The first protruding portion E2_210b of the piston 210b may come into contact with the sidewall forming the hollow portion 201b. That is, the end or side of the first protruding portion E2_210b may come into contact with the sidewall forming the hollow portion 201b.

The second protruding portion E3_210b of the piston 210b may come into contact with the sidewall forming the hollow portion 201b. That is, the end or side of the second protruding portion E3_210b may come into contact with the sidewall forming the hollow portion 201b.

The hollow portion 201b may be divided into the first area A1_201b, the second area A2_201b, and a third area A3_201b by the first protruding portion E2_210b and the second protruding portion E3_210b as boundaries therebetween. That is, the first protruding portion E2_210b and the second protruding portion E3_210b may divide the hollow portion 201b into three areas. The first area A1_201b may be an area where the elastic body 220 is located, the third area A3_201b may be connected to the second passage P2_200b, and the second area A2_201b may be positioned between the first area A1_201b and the third area A3_201b.

In some embodiments, the first area A1_201b and the second area A2_201b may be separated by the first protruding portion E2_210b so that fluid does not move therebetween. The second area A2_201b and the third area A3_201b may be separated by the second protruding portion E3_210b.

The central portion C_210b of the piston 210b may include a third passage P3_210b connecting the second area A2_201b and the third area A3_201b. That is, the control gas may move from the third area A3_201b to the second area A2_201b through the third passage P3_210b. In other words, when the control gas flows into the third area A3_201b, the control gas may move to the second area A2_201b through the third passage P3_210b.

In some embodiments, the first area A1_201b may be connected to the first hole H3, and the third area A3_201b may be connected to the second passage P2_200b. That is, the first area A1_201b may be adjacent to the lower surface 200b_L of the valve 200b, and the third area A3_201b may be adjacent to the upper surface 200b_U of the valve 200b.

When the control gas flows into the third area A3_201b through the second passage P2_200b, the control gas may flow into the second area A2_201b through the third passage P3_210b. That is, when the control gas flows into the hollow portion 201b, the pressure in the second area A2_201b and the third area A3_201b may be higher than that of the first area A1_201b. When the pressure in the second area A2_201b and the third area A3_201b increases, the piston 210b may move in a direction from the second area A2_201b toward the first area A1_201b.

In other words, when the control gas flows into the third area A3_201b, the piston 210b may come closer to the guide plate E1_100 in FIG. 2. That is, when the control gas flows into the third area A3_201b, the movement of the process fluid may be blocked since the piston 210b moves closer to the guide plate E1_100 and an external force is applied to the bending cover 110 to contact the guide plate E1_100.

When the control gas does not flow into the hollow portion 201b, the pressure in the second area A2_201b and the third area A3_201b may decrease and the elastic body 220 located in the first area A1_201b may relax or expand. When the elastic body 220 is relaxed, the first area A1_201b may increase and the piston 210b may move in a direction from the first area A1_201b toward the second area A2_201b.

That is, when the control gas does not flow into the third area A3_201b, the first area A1_201b may increase and the bending cover 110 may be spaced apart from the guide plate E1_100 in FIG. 2. In other words, when the control gas does not flow into the third area A3_201b, the bending cover 110 may be spaced apart from the guide plate E1_100 and the process fluid may move from one end to the other end of the fluid block 100.

Figure 11:
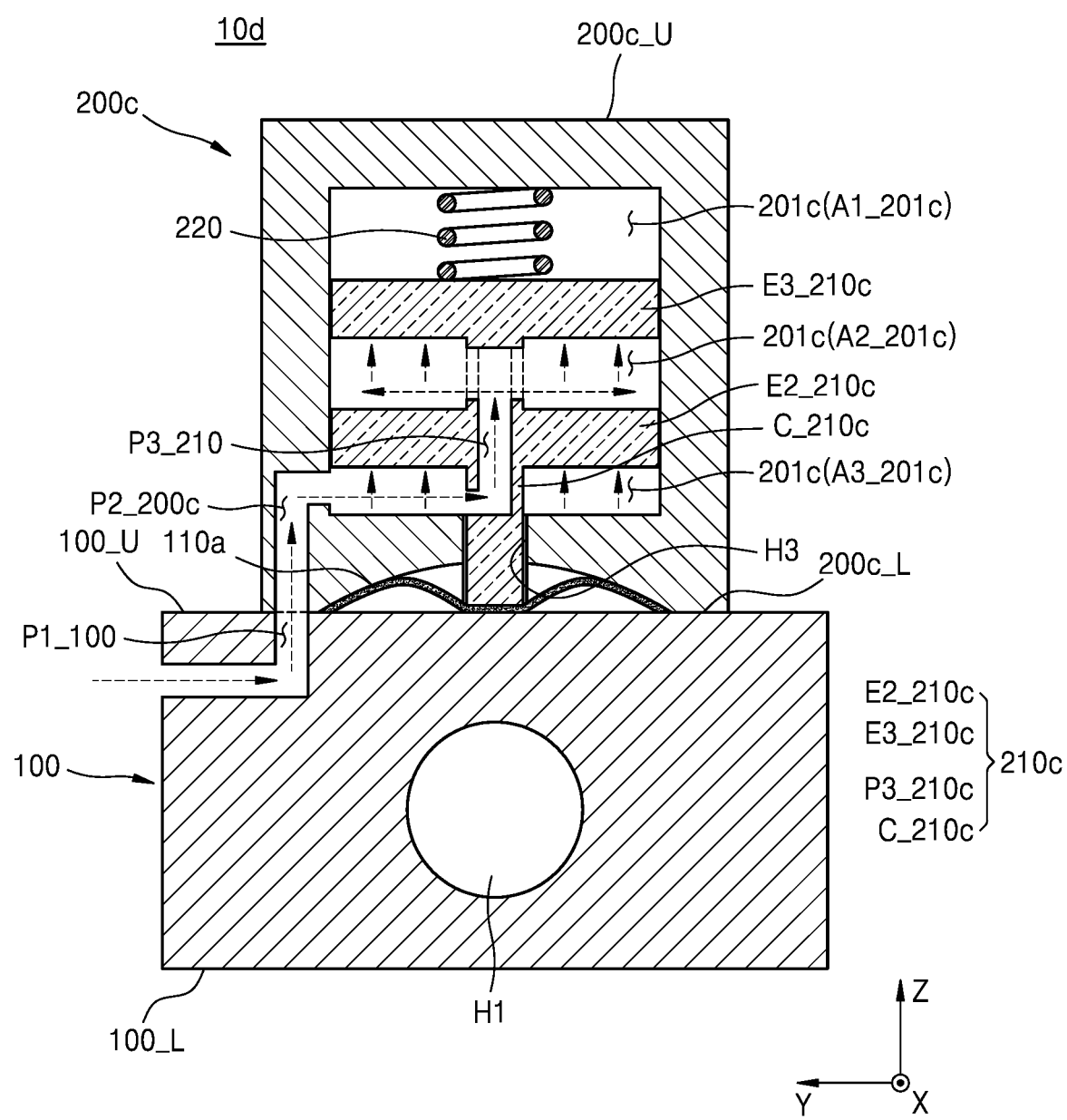
FIG. 11 is a side cross-sectional view schematically illustrating a fluid control device according to an embodiment.

FIG. 11 is a side cross-sectional view schematically illustrating a fluid control device according to an embodiment.

Hereinafter, in the interest of brevity, descriptions that are substantially the same between the fluid control device 10d of FIG. 11 and the fluid control device 10b of FIG. 6 may be omitted and differences therebetween are described.

Referring to FIG. 11, the fluid control device 10d may include the fluid block 100 and a valve 200c. In some embodiments, the fluid block 100 may be or include the fluid block 100 of FIG. 5.

The valve 200c of the fluid control device 10d may pressurize the bending cover 110a. The valve 200c may have the hollow portion 201c and the first hole H3. The first hole H3 may be connected to the hollow portion 201c and may extend from the lower surface 200c_L of the valve 200c to the hollow portion 201c. The valve 200c may include a piston 210c and the elastic body 220.

The piston 210c and the elastic body 220 may be located in the hollow portion 201c. The piston 210c may include the central portion C_210c, the first protruding portion E2_210c, and the second protruding portion E3_210c. The first protruding portion E2_210c may protrude or extend outward from the outer surface of the central portion C_210c. The second protruding portion E3_210c may protrude or extend outward from the outer surface of the central portion C_210c.

In some embodiments, the first protruding portion E2_210c and the second protruding portion E3_210c may be or include the first protruding portion E2_210b of FIG. 10 and the second protruding portion E3_210b of FIG. 10 described with reference to FIG. 10.

The hollow portion 201c may be divided into the first area A1_201c, the second area A2_201c, and the third area A3_201c by the first protruding portion E2_210c and the second protruding portion E3_210c as boundaries therebetween. That is, the first protruding portion E2_210c and the second protruding portion E3_210c may divide the hollow portion 201c into three areas. The first area A1_201c may be an area where the elastic body 220 is located, the third area A3_201c may be connected to the second passage P2_200c, and the second area A2_201c may be positioned between the first area A1_201c and the third area A3_201c.

In some embodiments, the first area A1_201c and the second area A2_201c may be separated by the second protruding portion E3_210c so that fluid does not move therebetween. The second area A2_201c and the third area A3_201c may be separated by the first protruding portion E2_210c.

The central portion C_210c of the piston 210c may include the third passage P3_210c connecting the second area A2_201c to the third area A3_201c. That is, the control gas may move from the third area A3_201c to the second area A2_201c through the third passage P3_210c. In other words, when the control gas flows into the third area A3_201c, the control gas may move to the second area A2_201c through the third passage P3_210c.

In some embodiments, the first area A1_201c may be located on the upper surface of the second protruding portion E3_210c, and the third area A3_201c may be connected to the first hole H3 and the second passage P2_200c. That is, the first area A1_201c may be adjacent to the upper surface 200c_U of the valve 200c, and the third area A3_201c may be adjacent to the lower surface 200c_L of the valve 200c.

When the control gas flows into the third area A3_201c through the second passage P2_200c, the control gas may flow into the second area A2_201c through the third passage P3_210c. That is, when the control gas flows into the hollow portion 201c, the pressure in the second area A2_201c and the third area A3_201c may be higher than that of the first area A1_201c. When the pressure in the second area A2_201c and the third area A3_201c increases, the piston 210c may move in a direction from the second area A2_201c toward the first area A1_201c.

In other words, when the control gas flows into the third area A3_201c, the piston 210c may be spaced apart from the guide plate E1_100 in FIG. 2. That is, when the control gas flows into the third area A3_210c, the bending cover 110a from which the external force is removed may be spaced apart from the guide plate E1_100 as the piston 210c is spaced apart from the guide plate E1_100, and the process fluid may move from one end to the other end of the fluid block 100.

When the control gas does not flow into the hollow portion 201c, the pressure in the second area A2_201c and the third area A3_201c may decrease and the elastic body 220 located in the first area A1_201c may relax or expand. When the elastic body 220 is relaxed, the first area A1_201c may increase and the piston 210c may move in a direction from the first area A1_201c toward the second area A2_201c.

That is, when the control gas does not flow into the third area A3_201c, the first area A1_201c may increase and the bending cover 110a may contact the guide plate E1_100 in FIG. 2. In other words, when the control gas does not flow into the third area A3_201c, the bending cover 110a may contact the guide plate E1_100 and the flow of the process fluid may be restricted.

Figure 12:
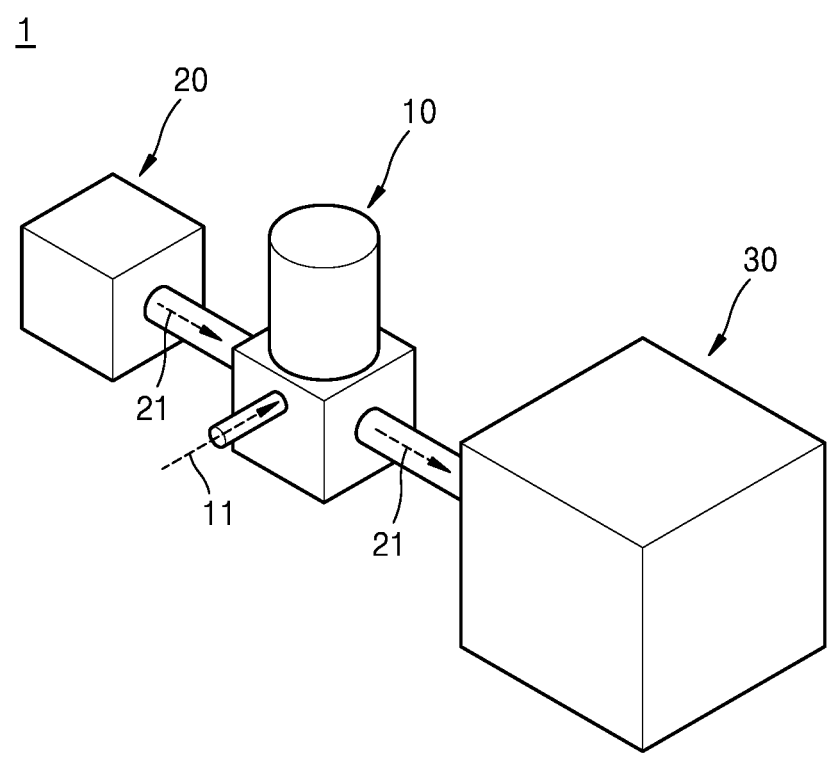
FIG. 12 is a conceptual diagram schematically illustrating a substrate processing apparatus according to an embodiment.

FIG. 12 is a conceptual diagram schematically illustrating a substrate processing apparatus according to an embodiment.

Referring to FIG. 12, a substrate processing apparatus 1 may include a fluid supplier or fluid supply 20, a first fluid control device 10, and a chamber 30.

The fluid supplier 20 of the substrate processing apparatus 1 may supply the process fluid 21 to the chamber 30. The fluid supplier 20 may supply the process fluid 21 to the chamber 30 through the first fluid control device 10. That is, the first fluid control device 10 may be arranged between the fluid supplier 20 and the chamber 30.

In some embodiments, the process fluid 21 may include one of $AsH_3$, $PH_3$, $H_2Se$, $SiH_4$, and $H_2S$. That is, the fluid supplier 20 may supply the process fluid required during the deposition process on substrates.

In some embodiments, the process fluid 21 may include at least one of $N_2$, $O_2$, $H_2$, Ar, and He. That is, the fluid supplier 20 may supply the process fluid required during the purge process on substrates.

In some embodiments, the process fluid 21 may include at least one of $Cl_2$, HCl, $CHF_3$, $CH_2F_2$, $CH_3F$, $H_2$, $BCL_3$, $SiCl_4$, $Br_2$, HBr, $NF_3$, $CF_4$, $C_2F_6$, $C_4F_8$, $SF_6$, $O_2$, $SO_2$ and COS. That is, the fluid supplier 20 may supply the etchant gas required during the dry etching process on substrates.

The first fluid control device 10 of the substrate processing apparatus 1 may adjust the flow rate of the process fluid 21. When the first fluid control device 10 is open, the process fluid 21 may flow from the fluid supplier 20 to the chamber 30. When the first fluid control device 10 is closed, the process fluid 21 may not flow from the fluid supplier 20 to the chamber 30.

In some embodiments, the first fluid control device 10 may include the fluid block 100 in FIG. 1 and the valve 200 in FIG. 1. The first fluid control device 10 may include the fluid control devices 10, 10a, 10b, 10c, and 10d described above with reference to FIGS. 1 to 11.

In some embodiments, the process fluid 21 may flow into the chamber 30 through the first channel H1 in FIG. 1 of the first fluid control device 10. That is, the process fluid 21 supplied from the fluid supplier 20 may flow into the chamber 30 through the first channel H1 in FIG. 1 and the second channel H2 in FIG. 1 of the fluid block 100 in FIG. 1.

The process fluid 21 may flow into the chamber 30 of the substrate processing apparatus 1. A space in which substrates are processed may be provided inside the chamber 30. That is, substrates may be positioned in the space of the chamber 30 and the process fluid may flow thereinto. In some embodiments, at least one substrate processing process of a thin film deposition process, a wet etching process, a dry etching process, and a cleaning process may be performed in the chamber 30.

In the substrate processing apparatus 1 of the inventive concept, the control gas 11 for controlling the first fluid control device 10 may be supplied to the hollow portion of the first fluid control device 10 through the first passage and the second passage located inside the first fluid control device 10. Since the first passage and the second passage through which the control gas 11 is supplied are located inside the fluid control device 10, damage, hardening, and deformation of the first passage and the second passage through which the control gas is supplied may be reduced during PM or BM. In addition, in the fluid control device 10, the supply of the process fluid 21 may be constant due to the reduction of damage, hardening, and deformation of the passages through which the control gas is supplied. In the substrate processing apparatus 1 to which the process fluid 21 is constantly supplied, a high-quality substrate process may be performed.

Figure 13:
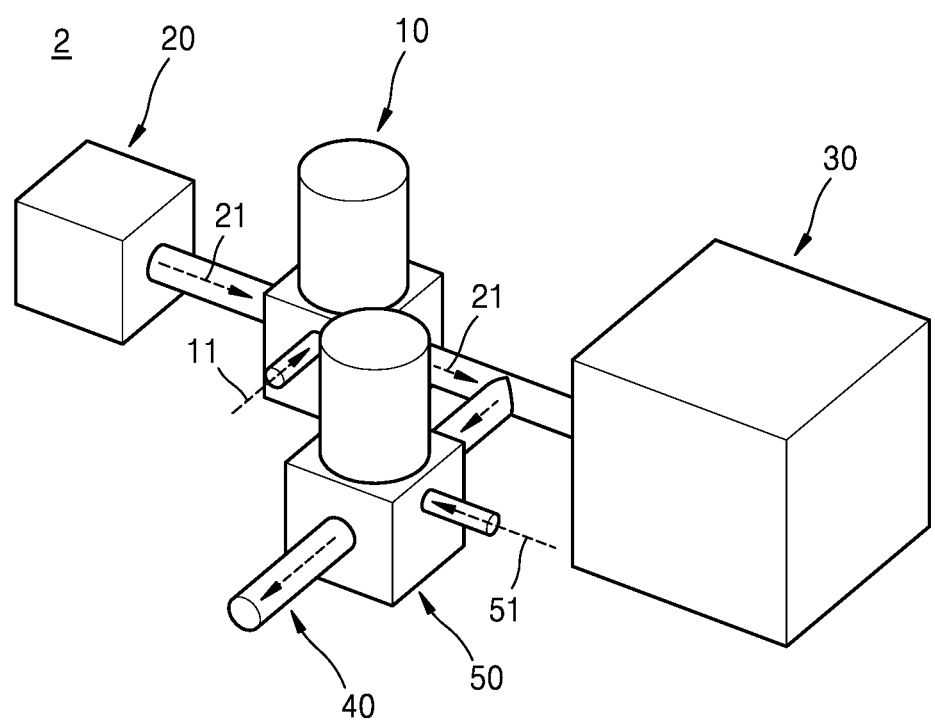
FIG. 13 is a conceptual diagram schematically illustrating a substrate processing apparatus according to an embodiment.

FIG. 13 is a conceptual diagram schematically illustrating a substrate processing apparatus according to an embodiment.

Hereinafter, in the interest of brevity, descriptions that are substantially the same between the substrate processing apparatus of FIG. 13 and the substrate processing apparatus of FIG. 12 may be omitted, and differences therebetween are described.

Referring to FIG. 13, a substrate processing apparatus 2 may further include a divert line or diversion line 40 and a second fluid control device 50.

The divert line 40 of the substrate processing apparatus 2 may discharge residual process fluid remaining in the chamber 30 to the outside after the substrate processing process is completed. In some embodiments, the divert line 40 may be connected to a line connecting the first fluid control device 10 to the chamber 30. In FIG. 13, the divert line 40 is connected to the line connecting the first fluid control device 10 to the chamber 30, but is not limited thereto, and the divert line 40 may be directly connected to the chamber 30.

The second fluid control device 50 of the substrate processing apparatus 2 may control the flow rate of the process fluid passing through the divert line 40. After the substrate processing process is completed in the chamber 30, the second fluid control device 50 may be open and the process fluid may flow out to the outside through the divert line 40. When the substrate processing process is in progress in the chamber 30, the second fluid control device 50 may be closed and the process fluid 21 may not flow out to the outside through the divert line 40.

In other words, during the substrate process, the substrate processing apparatus 2 may close the second fluid control device 50 to prevent the process fluid from flowing out to the outside. After the substrate process is completed, the substrate processing apparatus 2 may open the second fluid control device 50 to discharge the process fluid remaining in the chamber 30 to the outside.

In some embodiments, the second fluid control device 50 may include the fluid block 100 in FIG. 1 and the valve 200 in FIG. 1. The second fluid control device 50 may include the fluid control devices 10, 10a, 10b, 10c, and 10d described above with reference to FIGS. 1 to 11.

In the substrate processing apparatus 2 of the inventive concept, the control gas 51 for controlling the second fluid control device 50 may be supplied to the hollow portion of the second fluid control device 50 through the first and second passages positioned in the second fluid control device 50. Since first passage and the second passage through which the control gas 51 is supplied are located inside the second fluid control device 50, damage, hardening, and deformation of the first passage and the second passage through which the control gas 51 is supplied may be reduced during PM or BM. In addition, in the second fluid control device 50, the discharge of the process fluid 21 through the divert line 40 may be constant due to the reduction of damage, hardening, and deformation of the passages through which the control gas 51 is supplied. A high-quality substrate process may be performed in the substrate processing apparatus 2 where the process fluid 21 efficiently flows out.

While the inventive concept has been particularly shown and described with reference to embodiments thereof, it will be understood that various changes in form and details may be made therein without departing from the spirit and scope of the following claims.

What is claimed is:

1. A fluid control device comprising:
a fluid block having a first channel extending from an inlet at a first side of the fluid block to an outlet at a second side of the fluid block and a second channel above and in communication with the first channel, the fluid block including a bending cover configured to cover the second channel to thereby block fluid from flowing from the inlet to the outlet of the first channel; and
a valve having a hollow portion and a first hole connected to the hollow portion, and including a piston in the hollow portion and an elastic body configured to elastically support the piston, the valve configured to pressurize the bending cover;
wherein the fluid block includes a guide plate below the bending cover, the guide plate extending upwardly through the first channel,
wherein the fluid block includes a first passage through which control gas flows,
and wherein the valve includes a second passage connecting the first passage to the hollow portion.

2. The fluid control device of claim 1,
wherein the piston includes a central portion and a first protruding portion extending outwardly from an outer surface of the central portion,
wherein a part of the central portion extends through the first hole and contacts the bending cover,
and wherein the first protruding portion is in contact with a sidewall of the valve that at least partially defines the hollow portion.

3. The fluid control device of claim 2,
wherein the hollow portion is divided into a first area and a second area by the first protruding portion,
wherein the elastic body is in the first area of the hollow portion,
and wherein the second passage is connected to the second area of the hollow portion.

4. The fluid control device of claim 3,
wherein the first hole is connected to the first area of the hollow portion,
and wherein the piston is configured to descend toward the guide plate when the control gas flows into the second area.

5. The fluid control device of claim 4,
wherein the bending cover is spaced apart from the guide plate before the control gas flows into the second area,
and wherein the bending cover is pressurized by the piston and contacts the guide plate when the control gas flows into the second area.

6. The fluid control device of claim 3,
wherein the first hole is connected to the second area of the hollow portion,
and wherein the piston is configured to ascend away from the guide plate when the control gas flows into the second area of the hollow portion.

7. The fluid control device of claim 6,
wherein the bending cover is pressurized by the piston and in contact with the guide plate before the control gas flows into the second area of the hollow portion,
and wherein the bending cover is spaced apart from the guide plate when the control gas flows into the second area of the hollow portion.

8. The fluid control device of claim 1,
wherein the piston includes a central portion and first and second protruding portions extending outwardly from an outer surface of the central portion,
wherein a part of the central portion extends through the first hole and contacts the bending cover,
wherein the first protruding portion is spaced apart from the second protruding portion,
wherein the first protruding portion is in contact with a sidewall of the valve that at least partially defines the hollow portion,
and wherein the second protruding portion is in contact with the sidewall of the valve.

9. The fluid control device of claim 8,
wherein the hollow portion includes first, second, and third areas divided by the first and second protruding portions,
wherein the elastic body is in the first area of the hollow portion,
wherein the second area is between the first area of the hollow portion and the third area of the hollow portion,
wherein the second passage is connected to the third area of the hollow portion,
and wherein the central portion further includes a third passage connecting the second area and the third area.

10. The fluid control device of claim 9,
wherein the first hole is connected to the first area of the hollow portion,
and wherein the piston is configured to descend toward the guide plate when the control gas flows into the second and third areas.

11. The fluid control device of claim 9,
wherein the first hole is connected to the third area of the hollow portion,
and wherein the piston is configured to ascend away from the guide plate when the control gas flows into the second and third areas.

12. The fluid control device of claim 1,
wherein an area of a cross-section of the first passage is the same as an area of a cross-section of the second passage.

13. The fluid control device of claim 1,
wherein a cross-section of the first passage is circular, and wherein a cross-section of the second passage is circular.

14. The fluid control device of claim 1,
wherein
the first passage of the fluid block penetrates through the fluid block,
one end of the first passage is positioned at a side of the fluid block, and
the other end of the first passage is positioned at an upper surface of the fluid block.

15. The fluid control device of claim 1,
further including a sealing portion between the first passage and the second passage.

16. A substrate processing apparatus comprising:
a fluid supplier configured to supply process fluid;
a first fluid control device configured to control the supply of the process fluid; and
a chamber, into which the process fluid flows, configured to process a substrate,
wherein the first fluid control device comprises:
a fluid block having a first channel extending from an inlet at a first side of the fluid block to an outlet at a second side of the fluid block and a second channel above and in communication with the first channel, the fluid block including a bending cover configured to cover the second channel to thereby block fluid from flowing from the inlet to the outlet of the first channel; and
a valve having a hollow portion and a first hole connected to the hollow portion, and having a piston in the hollow portion and an elastic body configured to elastically support the piston, the valve configured to pressurize the bending cover,
wherein the fluid block includes a guide plate below the bending cover, the guide plate extending upwardly through the first channel,
wherein the process fluid flows into the chamber through the first channel,
wherein the fluid block includes a first passage through which control gas flows,
and wherein the valve includes a second passage connecting the first passage and the hollow portion.

17. The substrate processing apparatus of claim 16,
wherein the process fluid includes at least one of $AsH_3$, $PH_3$, $H_2Se$, $SiH_4$, and $H_2S$.

18. The substrate processing apparatus of claim 16,
wherein the process fluid includes at least one of $N_2$, $O_2$, $H_2$, Ar, and He.

19. The substrate processing apparatus of claim 16,
further comprising: a divert line; and
a second fluid control device on the divert line and configured to control fluid flowing through the divert line.

20. A substrate processing apparatus comprising:
a fluid supply configured to supply process fluid;
a first fluid control device configured to control a flow rate of the process fluid; and
a chamber, into which the process fluid flows, configured to process a substrate,
wherein the first fluid control device comprises:
a fluid block having a first channel extending from an inlet at a first side of the fluid block to an outlet at a second side of the fluid block and a second channel above and in communication with the first channel, the fluid block including a bending cover configured to cover the second channel to thereby block fluid from flowing from the inlet to the outlet of the first channel; and a valve having a hollow portion and a first hole connected to the hollow portion, and including a piston in the hollow portion and an elastic body configured to elastically support the piston, the valve configured to pressurize the bending cover, wherein the process fluid flows into the chamber through the first channel and includes at least one of $AsH_3$, $PH_3$, $H_2Se$, $SiH_4$, and $H_2S$, wherein the fluid block includes a guide plate below the bending cover, the guide plate extending upwardly through the first channel, wherein the piston includes a central portion and a first protruding portion extending outwardly from an outer surface of the central portion, wherein at least a part of the central portion extends through the first hole and contacts the bending cover, wherein the first protruding portion is in contact with a sidewall that at least partially defines the hollow portion, wherein the fluid block includes a first passage through which control gas flows, wherein the valve includes a second passage connecting the first passage to the hollow portion, and wherein a size of a cross-section of the first passage is the same as a size of a cross-section of the second passage.

* * * * *